United States Patent
Ferguson

(10) Patent No.: US 6,782,443 B2
(45) Date of Patent: Aug. 24, 2004

(54) EXTENSION OF USB FUNCTIONALITY THROUGH SHADOWING OF A REMOTE USB HOST CONTROLLER

(75) Inventor: Patrick Lee Ferguson, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 7 days.

(21) Appl. No.: 10/410,541

(22) Filed: Apr. 9, 2003

(65) Prior Publication Data

US 2003/0208643 A1 Nov. 6, 2003

Related U.S. Application Data

(63) Continuation of application No. 10/109,087, filed on Mar. 28, 2002.

(51) Int. Cl.[7] .......................... G06F 13/10; G06F 13/42
(52) U.S. Cl. ........................ 710/313; 710/63; 361/686; 385/100
(58) Field of Search ................................. 710/313, 314, 710/310, 306, 31, 104, 33, 8, 10, 62, 63; 361/683, 686; 348/14.03; 370/464; 709/220; 385/100

(56) References Cited

U.S. PATENT DOCUMENTS 6,173,355 B1 * 1/2001 Falik et al. ................. 710/310
6,678,760 B2 * 1/2004 Brief ............................ 710/52
6,742,076 B2 * 5/2004 Wang et al. ................ 710/314

OTHER PUBLICATIONS

"A serial link transceiver for USB2 high–speed mode" by Shyh–Jye Jou, Shu–Hua Kuo, Jui–Ta Chiu, Chu King, Chien–Hsiung Le Tim Liu (abstract only).*

* cited by examiner

Primary Examiner—Gopal C. Ray

(57) ABSTRACT

A KVM extension configuration that includes a host connected to a transmitter for transmitting communication signals across a KVM extension to a receiver where user interface devices are located. The host has a motherboard that supports USB communications. The KVM extension configuration includes a USB host controller at the receiver that initiates data reads and writes to the host as delayed transactions and supports USB protocol communication with a plurality of the user interface devices. The configuration also includes a transmitter core in the transmitter having shadow registers that include content that is copied from the configuration registers of the USB host controller at the receiver. The host successfully carries out USB communications with the transmitter through the use of the content of the shadow registers. In addition, the receiver periodically synchronizes the content of the shadow registers with content from the configuration registers of the USB host controller.

9 Claims, 3 Drawing Sheets

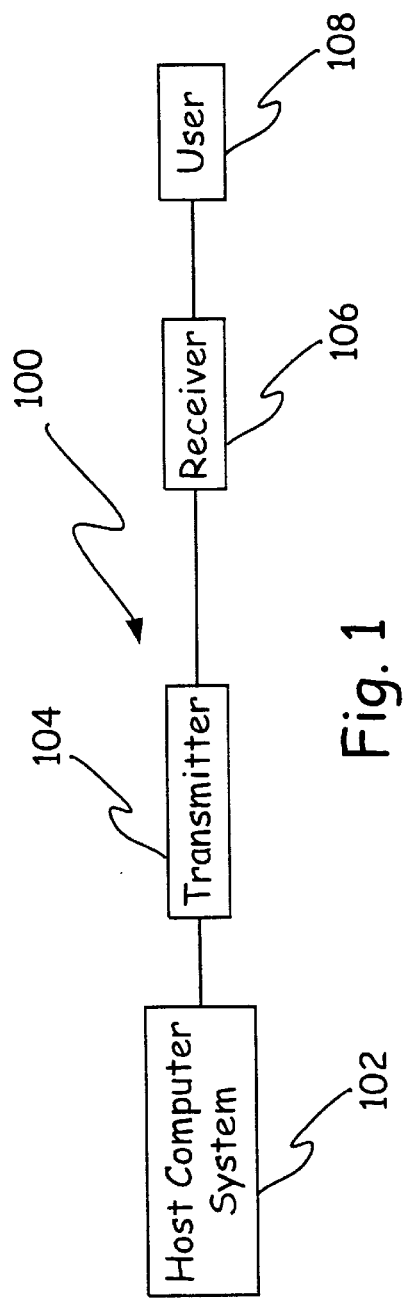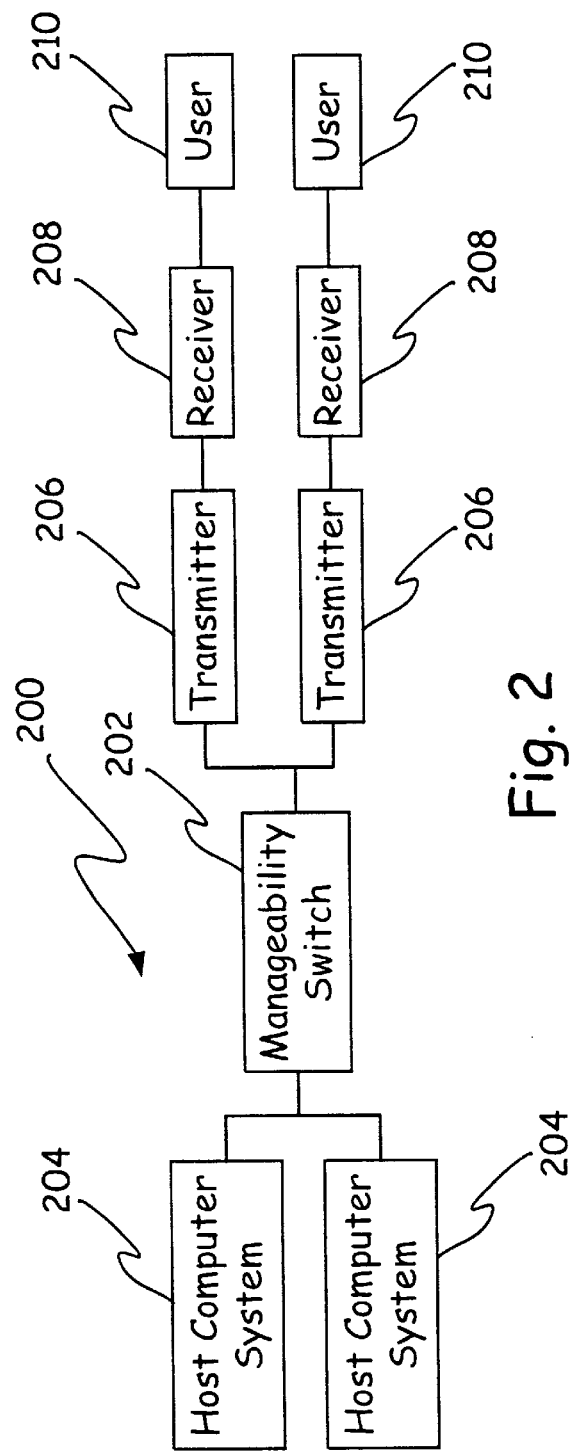

EXTENSION OF USB FUNCTIONALITY THROUGH SHADOWING OF A REMOTE USB HOST CONTROLLER

CROSS-REFERENCE TO RELATED APPLICATIONS

The present application is a continuation of U.S. application Ser. No. 10/109,087, filed Mar. 28, 2002, and is related to the following U.S. applications which are incorporated by reference herein in their entireties: U.S. application Ser. No. 10/035,757, filed Dec. 31, 2001, entitled "Method Of Connecting To A KVM Transmitter Using Internal Cables" by Ferguson et al.; U.S. application Ser. No. 10/035,778, filed Dec. 31, 2001, entitled "Solution For Integrating A KVM Extension Transmitter With A Graphics Controller On An Add-In Card" by Ferguson et al.; U.S. application Ser. No. 10/109,134, filed Mar. 28, 2002, entitled "Method Of Supporting Audio For KVM Extension In A Server" by Ferguson et al.; and U.S. application Ser. No. 10/109,589, filed Mar. 28, 2002, entitled "Method of Powering On and Off A Computer Using A Standard Keyboard" by Ferguson.

BACKGROUND OF THE INVENTION

Standard computer interfaces such as keyboard, mouse, video, and audio are often referred to as KVM ("keyboard, video, mouse") products. "KVM extension" can be defined as extending the access points for computer user interfaces such as keyboards, mice, monitors, etc., i.e., user interfaces may operate with a host processor although positioned outside the standard operating range for the user interface products. KVM extension products are particularly useful when dealing with rack mounted computer solutions where the computers of the rack are positioned away from the user interface products. However, among other things, today's rack mounted solutions suffer from excessive cabling issues when KVM extension products are introduced.

Fundamental components of computer interface extension solutions include KVM products, an extension receiver, an extension transmitter, and a host system. The extension solutions are commonly known as "KVM" (keyboard, video, mouse) extensions. A typical example for use of KVM extension solutions are remote trading solutions, i.e., when stock traders desire to perform remote trading without being required to accommodate a large number of host computer systems under their desk on the trading floor. The three major components used in remote trading solutions are a manageability switch, a transmitter/receiver pair, and a multi system switch. Each of these components are modular and can be used alone or in any combination. The KVM extension mode of operation typically supports user I/O protocols, sometimes referred to as "legacy" protocols, such as PS/2, analog video, and serial.

Many other problems and disadvantages of the prior art will become apparent to one skilled in the art after comparing such prior art with the present invention as described herein.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating certain embodiments of the invention, there are shown in the drawings embodiments which are presently preferred. It should be understood, however, that the invention is not limited to the precise arrangements and instrumentalities shown.

In the drawings:

FIG. 1 is a block diagram of a basic computer interface extension solution according to certain but not other principles of the present invention.

FIG. 2 is a block diagram of another basic computer interface extension solution wherein a manageability switch is introduced into the solution.

DETAILED DESCRIPTION OF THE INVENTION

Figure 3:
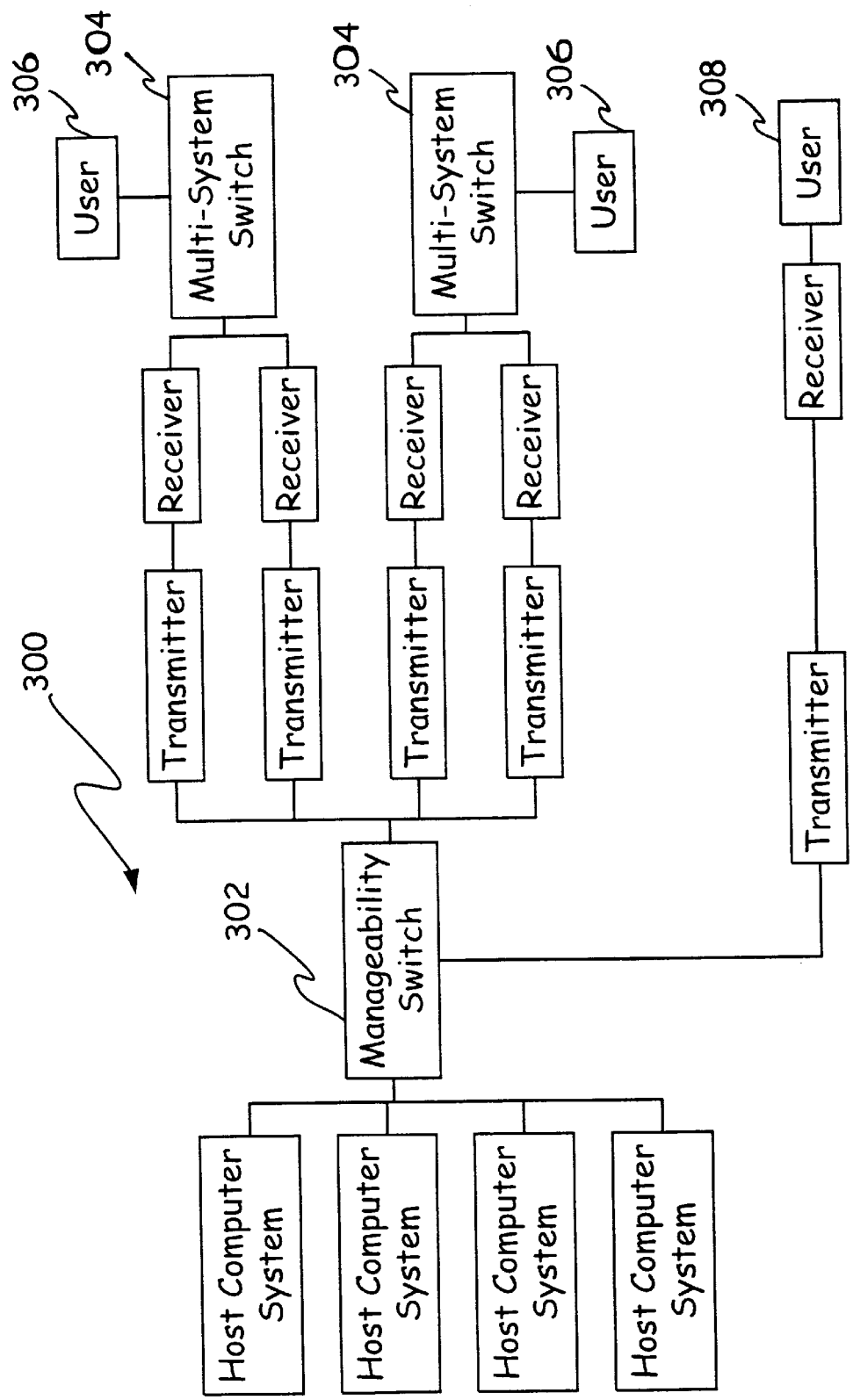
FIG. 3 is a block diagram of a computer interface extension solution wherein a manageability switch and multi-system switches are introduced into the solution.

Various but not other aspects of the present invention are realized through a KVM extension configuration that includes a host (also known as a "host computer system") connected to a transmitter for transmitting communication signals across a KVM extension to a receiver where user interface devices are located. The host has a motherboard that supports USB communications. The KVM extension configuration includes a USB host controller at the receiver that initiates data reads and writes to the host as delayed transactions and supports USB protocol communication with a plurality of the user interface devices. The configuration also includes a transmitter core in the transmitter having shadow registers that include content that is copied from the configuration registers of the USB host controller at the receiver. The host successfully carries out USB communications with the transmitter through the use of the content of the shadow registers. In addition, the receiver periodically synchronizes the content of the shadow registers with content from the configuration registers of the USB host controller.

In certain but not other embodiments, the transmitter of the KVM extension configuration includes a peripheral connection interface graphics controller that communicates with the motherboard independent of the USB signals of the host. Among other things, the user interface devices of the KVM extension configuration may include a keyboard, a mouse, a video monitor, a speaker, a serial link, a power button, and a microphone. The receiver of the KVM extension configuration may be extensibly connected to the transmitter via a fiber optic cable, a cable compatible with any version of category five or above type cables, or other appropriate communication media. The KVM extension configuration may also use a transmitter that is internal to the host and, for non-USB communications, communicates with the motherboard of the host via one of a PCI, PCI-X, or other industry standard communication interface with the transmitter.

Various but not other aspects of the invention may also be realized with a computer interface extension configuration that includes a host computer system that communicates with an extension transmitter. The configuration also includes an extension receiver that includes a USB host controller and USB configuration registers for supporting USB communications with at least one USB user interface device at the extension receiver. Also included is a transmitter core at the extension transmitter, the transmitter core having shadow registers that are periodically synchronized with the configuration registers of the USB host controller to support the USB protocols of the host computer system as though the at least one USB user interface device were located at the host computer system.

Of note, the computer interface extension configuration may include an extension transmitter that is internal to the host computer system and could even eliminate the need for legacy cables between the host computer system and the extension transmitter.

Still other aspects according to certain but not other principles of the present invention may be realized using a method for extending computer interface communications between a host computer and a plurality of computer interface devices. The method involves, not necessarily in this order, configuring an extension receiver with a USB host controller and USB configuration registers for USB communications with at least one USB device at the extension receiver; electrically connecting an extension transmitter card to a slot in the host computer system, the extension transmitter card including an extension transmitter device having shadow registers that are periodically synchronized with the USB configuration registers of the extension receiver; electrically connecting a motherboard header of the extension transmitter card to a connector on the host that is separate from the slot in the host with which the extension transmitter card is electrically connected; performing USB communications at the host computer using USB communication information stored in the shadow registers; and transmitting communications from the extension transmitter card to the extension receiver to complete operations with at least one of the plurality of computer interface devices.

Transmitting communications from the extension transmitter card may involve transmitting a request for updated configuration register information. Frequently, this request leads to updating the shadow registers of the extension transmitter device with the updated configuration register information.

Other systems, methods, features and advantages of the invention will be apparent to one with skill in the art upon examination of the following figures and detailed description. It is intended that all such additional systems, methods, features and advantages be included within this description, be within the scope of the invention, and be protected by the accompanying claims.

FIG. 1 is a block diagram of a basic computer interface extension solution 100 according to certain but not other principles of the present invention. The solution 100 is illustrated as having a host computer system 102 that communicates, in certain embodiments, with an extension transmitter 104 (herein referred to as "transmitter") via USB protocol. The transmitter 104 includes USB shadow registers (not shown) to support USB communications between the transmitter 104 and the computer system 102. The transmitter 104 is connected to an extension receiver 106 (herein referred to as "receiver") which is connected to a user 108. The receiver 106 includes a USB host controller (not shown) which is described in more detail herein. The user 108 is representative of user interface products (USB or otherwise) such as a keyboard, mouse, monitor, serial port, audio devices, etc. The USB shadow registers at the transmitter 104 operate behind a PCI interface in the transmitter 104 and are periodically synchronized with actual USB host controller configuration registers at the receiver 106. Thus, the computer system 102 may communicate with USB protocols as required by USB devices of the user 108, albeit the reads and writes of the USB host controller are executed as delayed transactions in the receiver 106 and pushed to the transmitter 104 for PCI to memory activity in the host computer system 102. Although data travels bi-directionally between the host computer system 102 and the user 108, to delineate the separation, the transmitter 104 and the receiver 106 are labeled as though data transfer occurs only in one direction, i.e., from the host computer system 102 to the user 108.

The transmitter 104 and receiver 106 are connected with a single cable such as a cable compatible with all versions of category 5, 6, 7, or better cables. The connection could also be made with fiber optic or other type of high speed data transmission cabling. In one embodiment, the distance between the transmitter 104 and receiver 106 ranges approximately 300 meters. In this manner are the user interface devices of the user 108 allowed to communicate effectively with the host computer system 102 across long distances, "long" as compared to user/host communication distances in a system without the transmitter 104/receiver 106 pair. Although illustrated external to the host 102, the transmitter 104 may be positioned internal to the host computer system 102 and use an internal connector with the motherboard of the system 102.

FIG. 2 is a block diagram of another basic computer interface extension solution 200 wherein a manageability switch 202 is introduced into the solution. The solution 200 includes multiple host computer systems 204, multiple transmitters 206, and multiple receivers 208 that support the communication extension for multiple users 210. The manageability switch 202 encompasses technology used to map a specific user to a specific system, to converge a large number of systems to a small number of users for system administration or head trader access, and to share a single system between two or more users.

FIG. 3 is a block diagram of a computer interface extension solution 300 wherein a manageability switch 302 and multi-system switches 304 are introduced into the solution 300. Along with users 306, an administrative user 308 is illustrated that provides the capability to monitor the users 306 and make adjustments to the solution 300 configuration if necessary.

Figure 4:
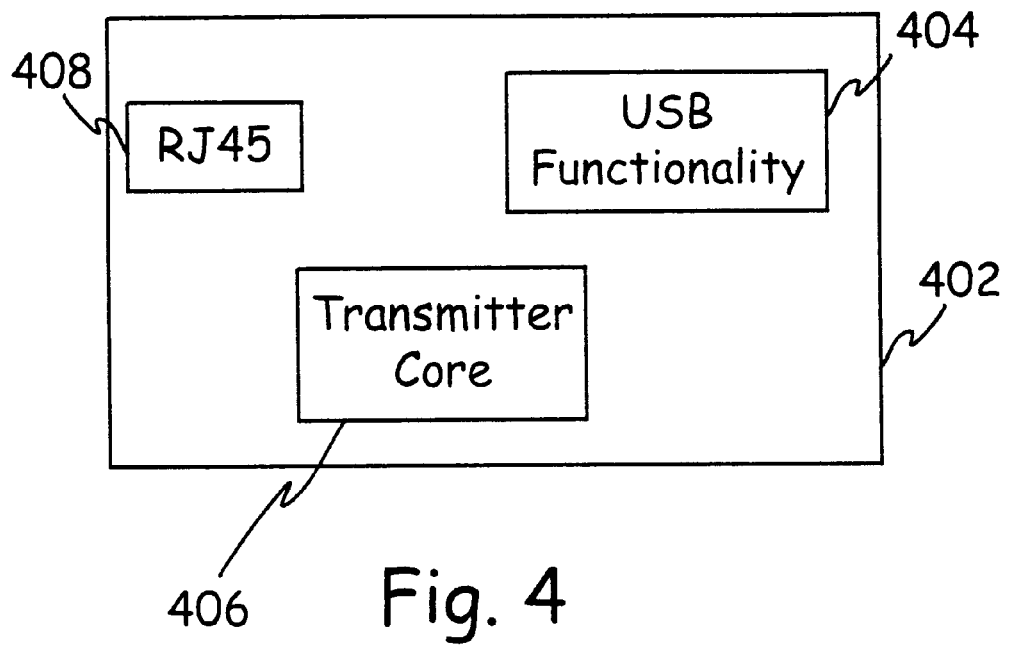
FIG. 4 is a simplified block diagram of exemplary transmitter circuitry components that are used in an extension transmitter according to certain but not other principles of the present invention.

FIG. 4 is a simplified block diagram of exemplary transmitter circuitry components 402 that are used in an extension transmitter such as the extension transmitter 104. The transmitter circuitry components 402 are configured to support the transmitter 104 in an extension solution such as the extension solution 100. However, unlike transmitter circuitry of the prior art, the transmitter circuitry 402 includes a USB functionality component 404. The USB functionality component 404 is introduced such that the transmitter circuitry components 402 operate with a USB protocol to support USB devices such as a keyboard and mouse operating at the user 108 end of the solution 100. The USB functionality component 404 typically includes shadow registers that are periodically synchronized with configuration registers of the USB host controller at the receiver 106.

Due at least in part to a transmitter core 406 and a communication link such as an RJ45 connector 408, the shadow registers hold a shadowed copy of the USB host controller configuration registers behind a PCI interface in a host such as the host computer system 102. The PCI cycles are transacted locally between the host 102 and the transmitter circuitry components 402 with the shadow registers and the USB configuration registers being periodically synchronized with the USB host controller of the receiver 106 through the communication link. In one embodiment, the shadow registers include 256 bytes of PCI configuration register space and a 64 byte data buffer. PCI write transactions to the host controller update the shadow registers and push the cycle to the remote host controller. PCI read transactions occur from the shadow registers without communication with the remote host controller.

Figure 5:
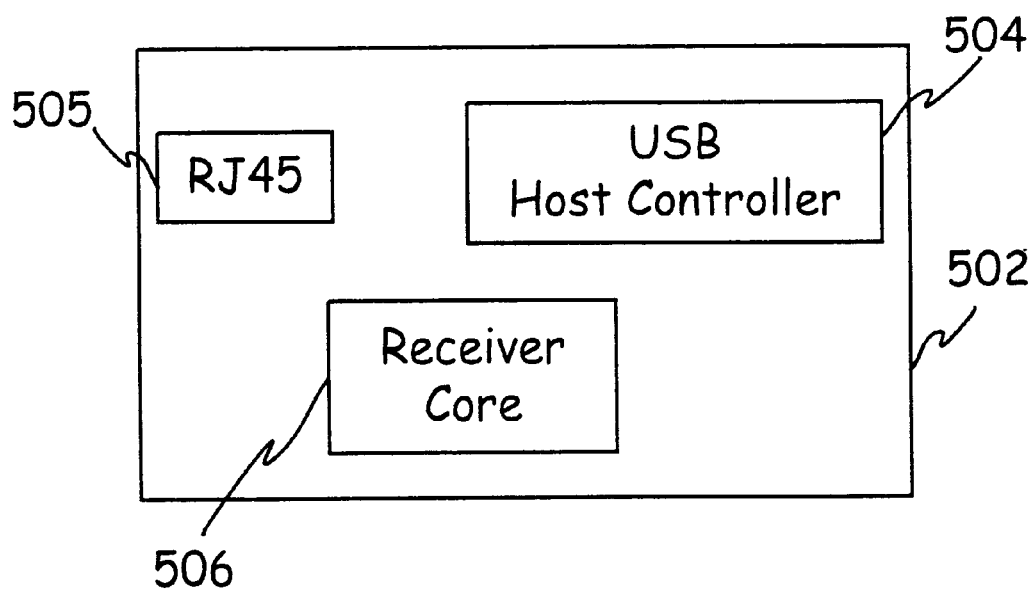
FIG. 5 is a simplified block diagram of exemplary receiver circuitry components that are used in an extension receiver according to certain but not other principles of the present invention.

FIG. 5 is a simplified block diagram of exemplary receiver circuitry components 502 that are used in an extension receiver such as the extension receiver 106. According to certain but not other principles of the present invention, a USB host controller 504 initiates data reads and writes for device data transfers which are executed as delayed transactions in the receiver 502 and pushed to the transmitter 402 via a communication link represented by an illustrated RJ45 connector 505. The USB host controller 504 initiates data reads and writes for device data transfers which are executed as delayed transactions in the receiver 106 and pushed to the transmitter 104 for PCI to memory activity.

Read data is returned to the remote USB host controller 504. Configuration registers in the remote USB host controller 504 are polled periodically by receiver 106 circuitry such as a receiver core 506 in the receiver circuitry 502 and changes are forwarded to the shadow registers of the USB functionality component 404 in the transmitter circuitry 402. The interrupts and power management sideband events are also forwarded to the transmitter PCI interface.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A KVM (keyboard, video, mouse) extension configuration comprising:

a host connected to a transmitter for transmitting communication signals across a KVM extension to a receiver where user interface devices are located, the host having a motherboard that supports USB communications;

a USB host controller at the receiver that initiates data reads and writes to the host as delayed transactions and supports USB protocol communication with a plurality of the user interface devices; and a transmitter core in the transmitter having shadow registers that include content that is copied from the configuration registers of the USB host controller at the receiver, the host successfully carrying out USB communications with the transmitter through the use of the content of the shadow registers, the receiver periodically synchronizing the content of the shadow registers with content from the configuration registers of the USB host controller.

2. The KVM extension configuration of claim 1 wherein the transmitter includes a peripheral connection interface graphics controller that communicates with the motherboard independent of the USB signals of the host.

3. The KVM extension configuration of claim 1 wherein the user interface devices comprise a keyboard, a mouse, a video monitor, a speaker, a serial link, a power button, and a microphone.

4. The KVM extension configuration of claim 1 wherein the receiver is extensibly connected to the transmitter via a fiber optic cable.

5. The KVM extension configuration of claim 1 wherein the receiver is extensibly connected to the transmitter via a cable compatible with any version of category five or above type cables.

6. The KVM extension configuration of claim 1 wherein the transmitter is disposed internally to the host and, for non-USB communications, communicates with the motherboard of the host via one of a PCI, PCI-X, or other industry standard communication interface with the transmitter.

7. A computer interface extension configuration comprising:

a host computer system that communicates with an extension transmitter;

an extension receiver that includes a USB host controller and USB configuration registers for supporting USB communications with at least one USB user interface device at the extension receiver; and a transmitter core at the extension transmitter, the transmitter core having shadow registers that are periodically synchronized with the configuration registers of the USB host controller to support the USB protocols of the host computer system as though the at least one USB user interface device were located at the host computer system.

8. The computer interface extension configuration of claim 7 wherein the extension transmitter is disposed internally to the host computer system.

9. The computer interface extension configuration of claim 7 wherein the extension transmitter eliminates the need for legacy cables between the host computer system and the extension transmitter.

* * * * *